US010543725B2

(12) United States Patent
Hall et al.

(10) Patent No.: US 10,543,725 B2
(45) Date of Patent: Jan. 28, 2020

(54) SYSTEM FOR DETERMINING TOWING EQUIPMENT COMPATIBILITY

(71) Applicant: Hall Labs LLC, Provo, UT (US)

(72) Inventors: Michael Hall, Provo, UT (US); David R. Hall, Provo, UT (US); Seth Myer, Eagle Mountain, UT (US)

(73) Assignee: Hall Labs LLC, Provo, UT (US)

( * ) Notice: Subject to any disclaimer, the term of this patent is extended or adjusted under 35 U.S.C. 154(b) by 0 days.

(21) Appl. No.: 16/159,847

(22) Filed: Oct. 15, 2018

(65) Prior Publication Data
US 2019/0143771 A1 May 16, 2019

Related U.S. Application Data

(60) Provisional application No. 62/584,276, filed on Nov. 10, 2017.

(51) Int. Cl.
G08B 21/00 (2006.01)
B60D 1/62 (2006.01)
B62D 63/08 (2006.01)
G06K 19/06 (2006.01)
B60D 1/24 (2006.01)
H04W 4/38 (2018.01)

(52) U.S. Cl.
CPC ............... B60D 1/62 (2013.01); B60D 1/248 (2013.01); B62D 63/08 (2013.01); G06K 19/06037 (2013.01); H04W 4/38 (2018.02)

(58) Field of Classification Search
CPC ........................................................ A60D 1/62
USPC ............... 340/431, 435, 438; 701/36, 48, 70
See application file for complete search history.

(56) References Cited

U.S. PATENT DOCUMENTS

| 9,327,566 B2* | 5/2016 | McAllister | B60D 1/62 |
| 9,738,125 B1* | 8/2017 | Brickley | H04W 4/70 |
| 2013/0253814 A1* | 9/2013 | Wirthlin | G01G 19/02 |
| | | | 701/124 |
| 2018/0244187 A1* | 8/2018 | Strano | B60P 3/04 |

* cited by examiner

Primary Examiner — Tai T Nguyen

(57) ABSTRACT

Disclosed is a system for determining tow equipment compatibility that includes a processing device having a processor and non-volatile memory. The system also includes a data input device configured to input at least one unique tow equipment identification code (UTEIC) identifying a specific piece of tow equipment and properties thereof. The processor is configured to receive the UTEIC from the data input device, receive a user input, determine tow equipment compatibility based on the user input and the UTEIC, and communicate tow equipment compatibility data to a user.

20 Claims, 4 Drawing Sheets

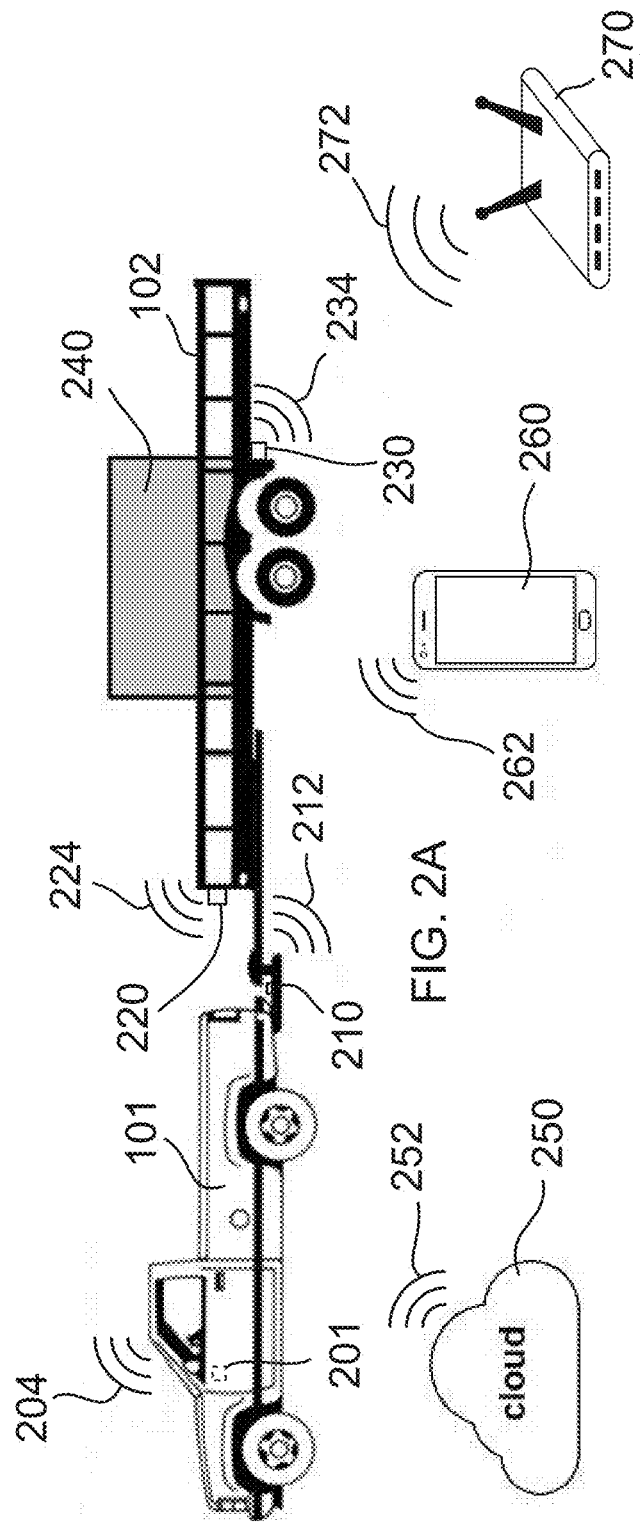

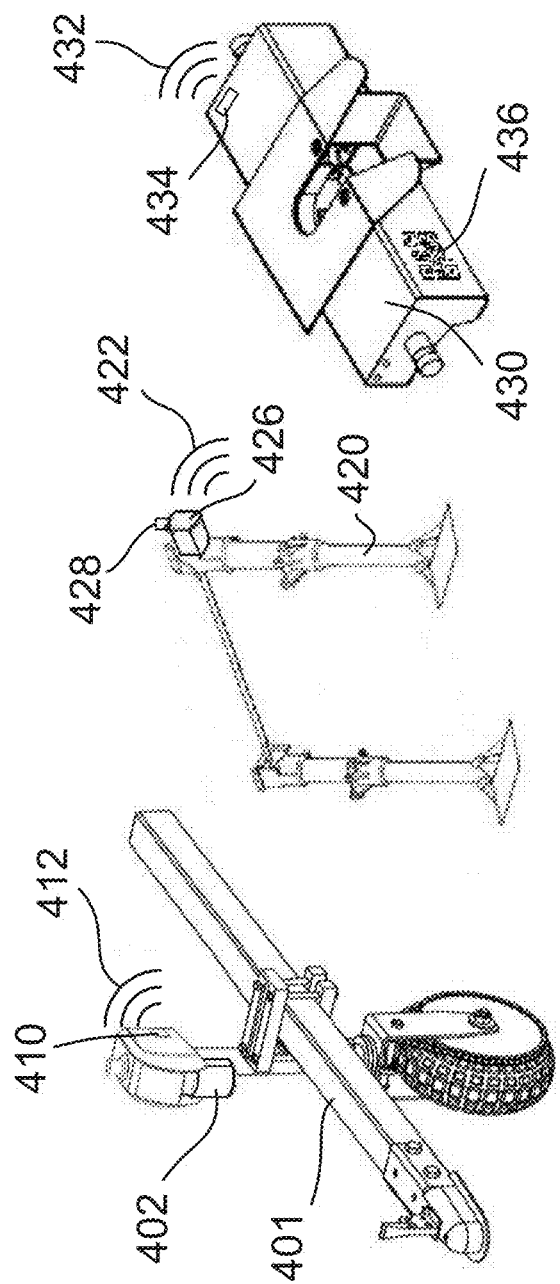

SYSTEM FOR DETERMINING TOWING EQUIPMENT COMPATIBILITY

CROSS-REFERENCE TO RELATED APPLICATIONS

The present application is a continuation-in-part of U.S. Provisional Application No. 62/584,276, filed Nov. 10, 2017, and entitled "App-Linked Devices Internet of Towing (ALDIT)." The entire disclosure of this prior application is incorporated by reference.

TECHNICAL FIELD

This invention generally relates to towing related devices and systems.

BACKGROUND

Many factors affect the safety and stability of towing a trailer attached to a tow vehicle. The associated tow equipment has factory ratings that assist a driver or user in determining if a specific towing set-up will handle the loads and towing requirements for that set-up. Setting up a trailer and knowing that loads are within the specifications can be difficult. Vehicles, hitches, ball mounts, Axles, and trailers all have ratings. It is difficult for a consumer to learn and understand all of the different specifications.

Tow equipment for one trailer may not have the correct ratings for a second trailer. The user or driver may attempt to haul the second trailer with the same set-up as the first trailer. This may create a potentially dangerous situation if the equipment is not rated to handle a larger load. The equipment may not perform properly and, in some cases, may fail entirely under the higher load.

The current methods of determining the proper tow equipment include knowing what the weight of the vehicle, the weight of the trailer along with the weight of all loads in the bed of the tow vehicle and loads on the trailer. In many cases, the user or driver may not know what these weights are. The ratings of each piece of tow equipment may also be unknown.

Without a method of determining the weights of the loads along with the ratings of each piece of towing equipment, it is difficult for the user or driver to confirm that each trailer set-up is safe. Therefore, a method is needed to determine whether the loads are within specifications for each trailer set-up and confirm that each piece of tow equipment within a specific set-up is within system ratings.

SUMMARY

In one aspect, the invention is a system for determining tow equipment compatibility that includes a processing device having a processor and non-volatile memory. The system also includes a data input device configured to input at least one unique tow equipment identification code (UTEIC) identifying a specific piece of tow equipment and properties thereof. The processor is configured to receive the UTEIC from the data input device, receive a user input, determine tow equipment compatibility based on the user input and the UTEIC, and communicate tow equipment compatibility data to a user.

In a preferred embodiment, the system includes a processing device that accepts user input and input from a scanner or other input device that identifies that specific piece of equipment. The system may also assign a specific and unique identification number to each specific piece of towing equipment. This unique ID number may include manufacturer specifications for that specific piece of towing equipment along with ratings for the equipment. The system may then compare the ratings of each piece of equipment is the system and determine whether they are compatible. The compatibility or lack of compatibility may then be communicated to the user. The user may then make adjustments to any equipment that is either not compatible or is not rated to handle the ratings required for that particular set-up. Set-up meaning the combination of all towing equipment within the system for a specific tow vehicle and trailer for example.

Consistent with the foregoing, a system for determining towing equipment compatibility (SDTEC) is disclosed. The objectives of the SDTEC are to utilize tow vehicle and trailer VIN, QR codes, Beacons and other ID systems or devices to sense equipment installed on a vehicle and/or a trailer. All equipment identified is then stored in computer memory of the SDTEC for future analysis. Additional objectives include the ability of the SDTEC to build a model of the tow vehicle and the trailer. Weight, axle load, and other sensors may then be compared to the equipment capability. Potential problems are then indicated to the user.

The SDTEC utilizes the VIN, QR codes, and/or Beacons and other ID systems or devices to sense the equipment installed on a vehicle. The system then builds a model of the tow vehicle and trailer. Weight, axle load, and other sensors may then be compared to the equipment capability.

The SDTEC senses loads and compares these loads to specifications, so that a user can be alerted to potential problems. Instead of relying on user education, the vehicle can do its own diagnostics to keep users out of dangerous situations.

In an embodiment, an app on-board the tow vehicle or an app on a mobile device may utilize Bluetooth to search for Beacons in range. Beacons may be embedded in any and all towing products within a tow haul system. The tow haul system may include one or more of: a hitch, ball mount, pin box, axles, tow vehicle, electric trailer jacks electric tongue jack, electric leveling jacks on the front of the 5th wheel trailer, along with any and all equipment associated with a trailer and its connection to a tow vehicle. The Beacons may be iBeacons or similar wireless based low power devices with broadcaster/receiver. The Beacons may be capable of advertising iBeacon, Eddystone packets or similar, via Bluetooth Low Energy (BLE) or other low power wireless technology.

In certain embodiments, these tow haul system products and equipment may have QR codes printed on them. The app may direct the user to scan each of these QR codes. Other embodiments may employ Near Field Communication (NFC) or Passive and Active Radio Frequency Identification (RFID). NFC and RFID do not require a power source.

Once each specific equipment or part including tow vehicle and trailer are identified, the VIN or other identifying codes are stored in memory for future use. In cases where the manufacturer specifications are known, they are automatically associated with the entered ID for that specific equipment. In some cases, the user may be prompted to enter in the manufacturer specifications (typically weight ratings) for that specific piece of equipment.

The QR codes, and/or beacons inform the app of the type of equipment, as well as the capability (max load rating). The app may accept inputs from weight sensing, axle load sensing, pitch sensing, etc. to ensure all loads are within ratings.

The SDTEC may further comprise a hub for the broader internet of towing. The data gathered by the SDTEC is communicated to the cloud via the hub's cell phone radio, satellite radio, or other wireless type. The SDTEC may then communicate with fleet management systems, other vehicles, and other products on board the vehicle.

The SDTEC may also include an energy storage system. In an embodiment, the energy storage system may be charged by solar cells, motion power, vibration energy, or kinetic energy harvesting devices. The energy storage may comprise batteries, capacitors or combinations of these and other known energy storage devices or systems.

The SDTEC consists of software and/or firmware that enables the hardware in a tow vehicle and/or in a trailer to identify a tow vehicle, trailer and associated weights. The SDTEC may further comprise sensors or systems that assist in the identification of equipment including tow vehicle, trailer and their specifications regarding haul weight.

In certain embodiments, the SDTEC further comprises a cell phone radio or satellite radio to enable communication to the cloud. This allows connection to other Internet of Towing devices, along with relaying and storage of data. In another embodiment, the app along with a processor and memory reside in a cloud-based management system.

The SDTEC may include one or more of the following components: Sensors—electrical current, temperature, accelerometers, weight or load; Processor; Controller or microcontroller; Memory or other data storage device or module; Wireless device; Cell phone radio or satellite radio; Network hub; Power source; and an energy harvesting or charging device.

The basic process of how the SDTEC is used or implemented is as follows: A user opens the app on a mobile device (or app "on-board" vehicle or OEM) that prompts the user to indicate equipment included in the system. This may include a tow vehicle and a trailer along with all equipment in the tow haul system. The user selects the equipment by scanning QR codes or other ID methods that enters this data into the memory or data storage module. The specifications including weight allowances for the specific equipment entered in is then compared to manufacturer's specifications, then communicated to the user.

If any of the equipment identified as part of the tow haul system is out of specification, an alert is sent to the user identifying which specific piece of equipment is not compatible with this particular set-up. The out of spec equipment is identified, and the user may then replace it with a part that is rated properly.

For example, if the SDTEC identifies a ball mount that has a rating too low for a given set-up, the user may be alerted. The user may then remove the ball mount and replace it with a second heavier duty ball mount. Once the second heavier duty ball mount is scanned or identified, the SDTEC may alert the user that it is now "OK". In certain embodiments, the SDTEC may also communicate to the user the rating required for this particular set-up. In this example, the user may need to go to a store and purchase a heavier duty ball mount. The app in this case lists the minimum rating needed for this set-up. Information regarding all compatibility requirements may also be communicated, including the receiver size of the hitch on the tow vehicle, in the case wherein the ball mount is to be mounted to the tow vehicle. In this way, not only the rating of the ball mount, but also all other compatibility requirements are known prior to going to the store to purchase the necessary equipment. The ball mount is required to fit both the trailer and the tow vehicle and be rated for the loads.

In embodiments that comprise wireless ID of the equipment, the user may be alerted automatically as soon as the vehicle is attached to the trailer. The SDTEC in this case may immediately recognize the equipment as soon as it is connected. In certain embodiments, the app may alert the user that the tow vehicle and trailer are compatible and OK to connect prior to this connection happening. This may occur when they are within a (user specified, or factory default specified) range.

If the weight of the tow vehicle and the trailer are within specifications, and they are compatible, this information ("OK to haul", green indicator light or other visual alert, or audible positive alert) is then communicated to the user. If any one of the equipment weights are outside of the specifications, a negative ("Not OK", red light or other visual alert, or audible negative alert) is communicated to the user so that adjustments may be made. In some cases, a trailer may be out of spec even without anything loaded on to it. In this case, the user may be alerted to it being out of spec even before it is loaded.

In certain embodiments, the SDTEC may continue to monitor the weight during loading of the tow vehicle and trailer in real-time, sending alerts ("OK" or "Not OK") periodically to indicate if and when the specifications are met or exceeded. There may also be intermediate alerts (either audible or visual) indicating maximum specified weight limits are being approached.

In other embodiments, the SDTEC may continue to monitor the weights and loads on each component or part of the tow haul system during travel and alert the user of any changes. For example, if one or more loads happen to shift during travel, it may increase the tongue weight beyond specifications. In this case, the user may then be immediately alerted by the app and pull over to make adjustments to the load.

The SDTEC includes a system for determining towing equipment compatibility; including a tow vehicle, a trailer, a mobile device, and at least one unique tow equipment identification code (UTEIC) identifying a specific piece of tow equipment. The system also includes at least one data input device, and a server comprising a processor and non-volatile memory. The processor is configured to: receive the UTEIC from the data input device, receive a user input from the mobile device, determine tow equipment compatibility based on the user input and the UTEIC; and communicate the tow equipment compatibility data to a user.

In certain embodiments, the input device further include: one or more sensors; wherein the one or more sensors produce sensor data. The input device may also receive weight data from a weight determination system. In other embodiments, the input device receives vehicle VIN data. In an embodiment, the input device is a QR code scanner. In another embodiment, the input device is an OBD device connected by a plug-in connector to a vehicle OBD port. In a certain embodiment, the input device receives and transmits data via a wireless interface.

In an embodiment, the system may send compatibility data to a vehicle computer server. In an embodiment, the wireless interface utilizes a protocol of at least one of a Bluetooth, Bluetooth mesh, WIFI, NFC, RFID, BLE, Zig-Bee, Z-wave, LoRaWAN, Dash7, DigiMesh, ANT, ANT+, NB-loT, 3G, 4G, 5G, LTE or combinations thereof.

In an embodiment, the non-volatile memory may store factory settings, factory ratings and user settings specific to each UTEIC. In a certain embodiment, the processor may be configured to build a model of the tow vehicle and the trailer set-up for a specific vehicle connected to a specific trailer.

The model may determine compatibility based on the data associated with a specific UTEIC for each specific piece of tow equipment for the model. The model may be stored in the non-volatile memory, and the system may communicate compatibility for the model. The system may further alert the user to all incompatibility by identifying which UTEIC is non-compatible, along with the specified ratings for the non-compatible UTEIC.

In an embodiment, the sensors may convert sensor data to an electrical signal. The sensors may include at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

In other embodiments, the system may further include a cloud-based network. Factory settings, the user settings and the sensor data may be stored in the memory of the cloud-based network. The cloud-based network processor may be configured to: determine ratings for a specific towing set-up of tow vehicle and trailer along with all associated tow equipment to confirm tow equipment compatibility and transmit the tow equipment compatibility to the system based on the user command, the sensor data, the factory settings, and the user settings.

In an embodiment, the mobile device may include a cell phone, satellite phone, smartphone, personal digital assistant, tablet computer, laptop computer, remote control device, mobile transmitter, a mobile internet device or a combination of one or more of the same.

In another embodiment, the tow equipment may include a tow vehicle, hitch, ball, receiver, jack, lift, pin box, trailer, sensor, actuator, sway bar, stabilizer bar, weight distribution device, equipment connected to trailer, equipment connected to tow vehicle or a combination of one or more of the same.

In other embodiments, the system may further include one or more energy storage devices such as capacitors or batteries. The system may also include and one or more energy harvesting devices such as solar panels, vibration harvesting devices or wind powered energy producing devices.

In an embodiment, the system may communicate the tow equipment compatibility data to the user via audible alerts. The system may also communicate this data via visual alerts.

In another embodiment, the system may also include a network hub device for connection of the system to a network.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

FIG. 2A shows an embodiment of a wireless implementation of the system.

FIG. 2B illustrates a cloud interface with the system.

FIG. 2C illustrates a mobile app on the mobile device 260 shown.

FIG. 2D illustrates a network hub communicating to the system.

FIG. 4A is an illustration of a trailer jack with a motorized jack stand.

FIG. 4B is an illustration of trailer jack stands for a fifth wheel trailer.

FIG. 4C is an illustration of a fifth wheel trailer pin box.

DETAILED DESCRIPTION

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Figure 1A:
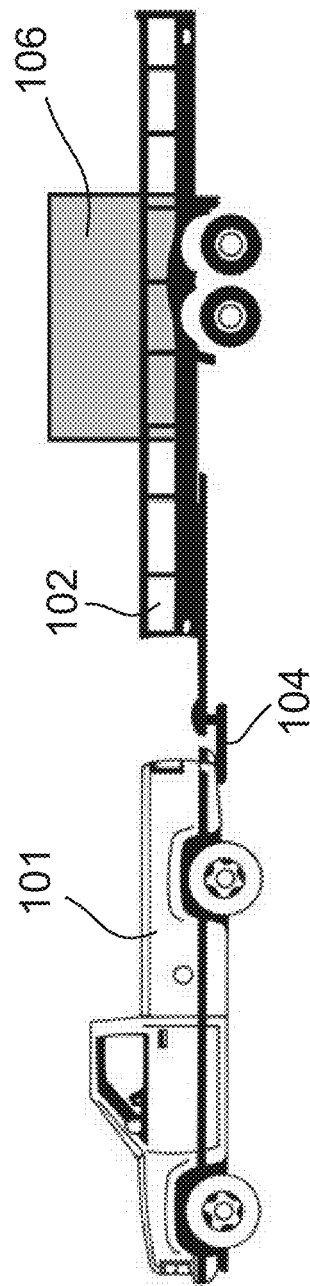
FIG. 1A is an illustration of a truck pulling a flatbed trailer.

FIG. 1A is an illustration depicting one scenario demonstrating how the SDTEC may be implemented for a specific truck pulling a flatbed trailer. Truck 101 is shown hauling flatbed trailer 102. Hitch 104 may be rated to handle a load of 1,000 pounds. The weight 106 together with the weight of the flatbed trailer may be 1,500 lbs. In this case, the system would communicate this discrepancy to the driver, and he would then have the option of either reducing the weight 106 to comply with the recommended ratings or alternatively replace the hitch 104 with one that is rated for the higher weight. Once this adjustment has been made, the driver could then activate the system to determine if the set-up is now within system ratings and is therefore safe to drive.

Figure 1B:
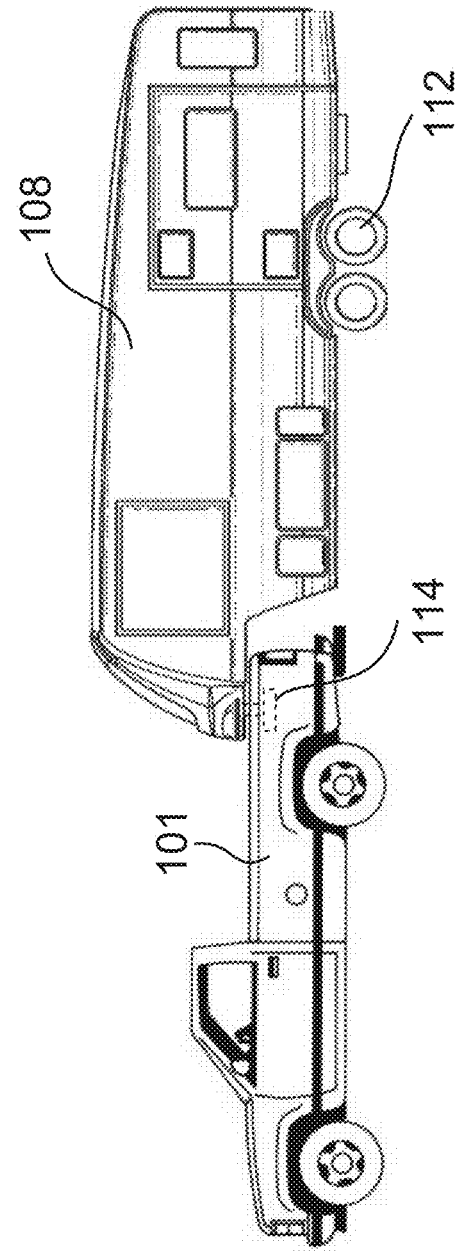
FIG. 1B is an illustration of a truck pulling a fifth wheel camping trailer.

FIG. 1B is an illustration depicting another scenario demonstrating how the SDTEC may be implemented for a truck pulling a fifth wheel camping trailer. Truck 101 is shown hauling camping trailer 108. Pin box hitch 114 may be rated to handle 2,000 pounds. Ratings of the axles 112 may be communicated to the system. In this set-up, the system may confirm that the weight of the camping trailer 108, pin box hitch 114, axles 112 and the truck 101 are within specifications.

The flatbed trailer 102 has different load ratings than the fifth wheel camping trailer 108. Each of these set-ups shown in FIG. 1A and FIG. 1B have different ratings for the receiver hitch for the flatbed trailer vs the pin box connection for the fifth wheel trailer. Even though the same truck is used for both trailers, the load ratings may be different for each of the shown trailer types. The SDTEC assists the user in determining if each of these two example set-ups are within specifications. The system may determine that the truck ratings are not high enough to handle the higher load of the camping trailer for example. Additionally, the system may store the settings for each of these two set-ups for future trips. The sensors may be read at the time of set-up, and the system may determine that the set-up is the same as before and give the go ahead that it is safe to proceed.

FIG. 2A shows an embodiment of a wireless implementation of the system, with the system 201 on-board the truck 101 as shown. Wireless signal 204 communicates from the truck system 201 to each of the tow equipment components. Wireless signal 224 communicates the trailer UTEIC 220 to the system 201. Wireless signal 212 communicates the trailer hitch UTEIC 210 to the system 201. Load 240 on trailer 102 is communicated via wireless signal 234 along with axle UTEIC 230 to the system 201.

FIG. 2B illustrates a cloud interface with the system. The system 201 in FIG. 2A communicates via wireless signal 252 to the cloud 250. All relevant data and information including modeling for each set-up are communicated to the cloud 250. All settings, manufacturers ratings, set-ups and user input data may be stored in the cloud. In some embodiments, set-up information may be retained in the cloud and downloaded to the system after a system failure, or data loss.

FIG. 2C illustrates a mobile app on the mobile device 260 shown. In this embodiment, the system is on the mobile device and all interface between the tow equipment is done wirelessly via signal 262.

FIG. 2D illustrates a network hub communicating to the system. In this embodiment, the system 201 communicates to a network or the cloud 250 via wireless signal 272 to network hub 270. The SDTEC may communicate to other connected (via cloud) vehicles or equipment.

In some embodiments, both the on-board app and a mobile app may communicate to each other and give access to the SDTEC. In other embodiments, the signal to the vehicle is purely to identify the vehicle and the app is only on the mobile device. Each and every piece of equipment includes a wireless device to communicate with the SDTEC in the embodiments shown in FIGS. 2A, 2B, 2C and 2D.

Figure 3:
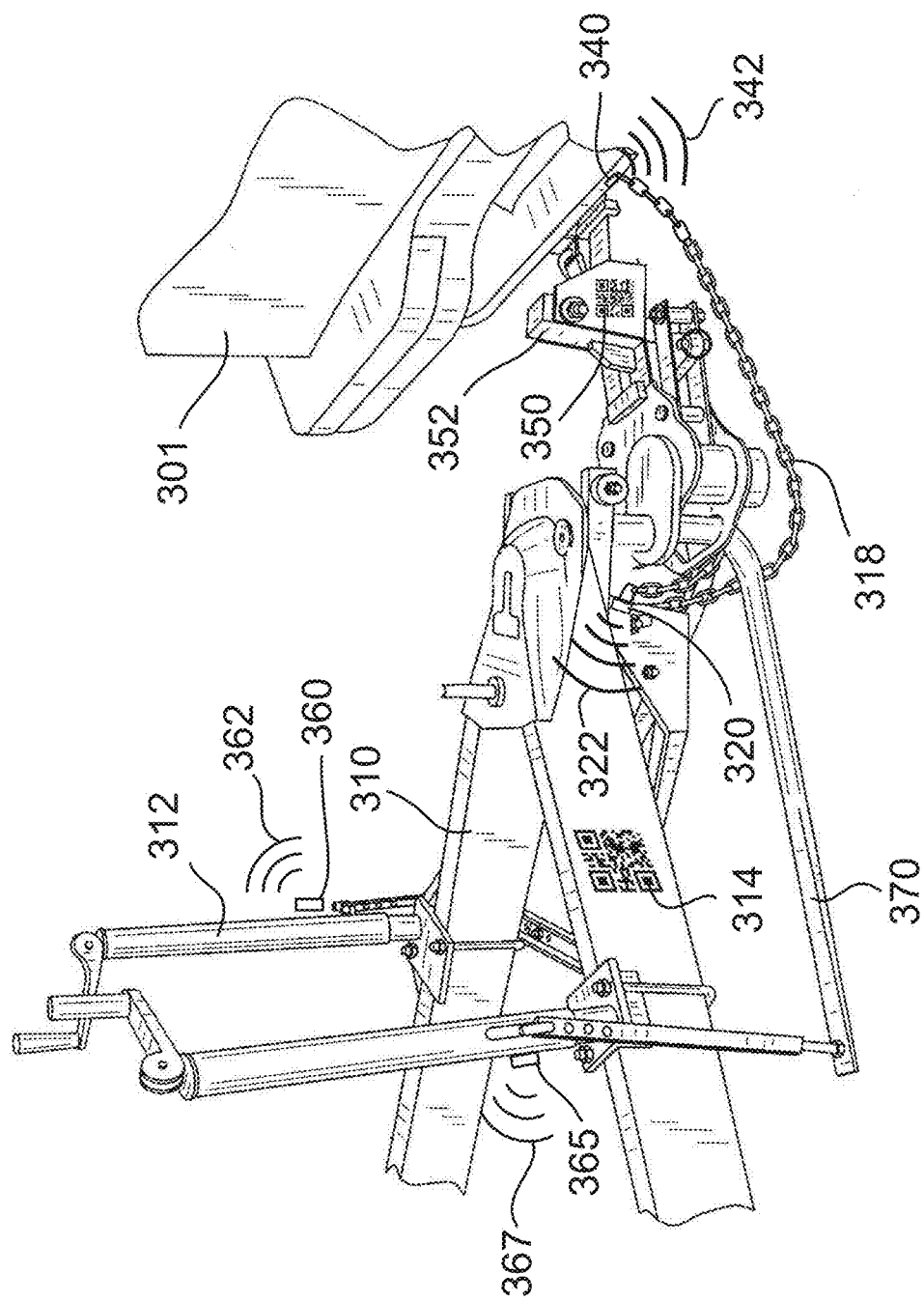
FIG. 3 is an illustration of a trailer hitch connected to the back of a truck.

FIG. 3 is an illustration of a trailer hitch connected to the back of a truck. Truck 301 has a receiver hitch 352 which is connected to trailer 310. In this embodiment, the receiver hitch 352 has both a QR code 350 along with a wireless device 340 for communication of data to the system 201. The trailer 310 also has both a QR code 314 and wireless transmission device 320. The user has the choice of scanning one or both of the QR codes to enter tow equipment data into system 201. Alternatively, the system 201 may automatically request notification from wireless device 340 via wireless signal 342, and wireless device 320 via wireless signal 322 as the trailer is hooked up. In some embodiments, device 340 may also include a sensor indicating that the chains 318 have been connected. The data informing the system may also include this chain connection data to assure that the safety chains 318 are in place before driving off. In a similar manner, jacks 312 and 313 may include sensors 360 and 365 that transmit signals 362 and 367 to the system 201 alerting the system that the jacks are fully seated and in the correct position. In certain embodiments, jacks 312 and 313 may adjust anti-sway or stabilizer bars. The proper settings of these bars may be communicated to the system 201.

FIG. 4A is an illustration of a trailer jack with a motorized jack stand. Trailer arm 401 is attached to motorized jack stand 402. In this embodiment, the trailer weight may be determined by the sensor 410 which determines the weight of the trailer. Wireless signal 412 communicates sensor information to the system 201. In an embodiment, the position of the jack stand 402 may also be communicated to the system 201.

FIG. 4B is an illustration of trailer jack stands for a fifth wheel trailer. In this embodiment, the motor 426 for fifth wheel trailer jack stands 420 includes a sensor 428 which determines the weight of the fifth wheel trailer along with the position of the jack stands 420. In an embodiment, the weight and position data is transmitted via wireless signal 422 to the system 201.

FIG. 4C is an illustration of a fifth wheel trailer pin box. In this embodiment, both a QR code 436 along with a wireless device 434 are shown. The user may read the QR code with a QR scanner or alternatively, the wireless device 434 may communicate sensor data, position data or weight data via wireless signal 432 to the system 201.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. A system for determining tow equipment compatibility, comprising:
    a processing device comprising a processor and non-volatile memory;

a data input device configured to receive input of at least one unique tow equipment identification code (UTEIC) identifying a specific piece of tow equipment and properties thereof from at least one of: a user, sensors, a network or a combination thereof;
wherein the data input device is a hand-held device operated by a user;
wherein the processor is configured to:
receive the UTEIC from the data input device;
receive a user input;
wherein the user input comprises the UTEIC and user settings;
determine tow equipment compatibility based on the user input and the UTEIC; and
communicate tow equipment compatibility data to a user.

2. The system of claim 1, wherein the data input device further comprises one or more sensors that produce sensor data.

3. The system of claim 1, wherein the data input device receives weight data from a weight determination system.

4. The system of claim 1, wherein the data input device receives vehicle VIN data.

5. The system of claim 1, wherein the data input device is a QR code scanner.

6. The system of claim 1, wherein data the input device is an On Board Diagnostic device connected by a plug-in connector to a vehicle On Board Diagnostic port.

7. The system of claim 1, wherein the system is configured to send compatibility data to a vehicle computer server.

8. The system of claim 1, wherein the data input device receives and transmits data via a wireless interface.

9. The system of claim 8, wherein the wireless interface utilizes a protocol of a Bluetooth, Bluetooth mesh, WIFI, NFC, RFID, BLE, ZigBee, Z-wave, LoRaWAN, Dash7, DigiMesh, ANT, ANT+, NB-IoT, 3G, 4G, 5G, LTE or combinations thereof.

10. The system of claim 1, wherein the non-volatile memory stores factory settings and user settings specific to each UTEIC.

11. The system of claim 10, wherein the processor is configured to build a model of a tow vehicle and a trailer set-up for a specific vehicle connected to a specific trailer;
wherein the model determines compatibility based on data associated with a specific UTEIC for each specific piece of tow equipment for the model;
wherein the model is stored in the non-volatile memory;
wherein the system communicates compatibility for the model; and
wherein the system alerts the user to all incompatibility by identifying which UTEIC is non-compatible, along with specified ratings for non-compatible UTEIC.

12. The system of claim 2, wherein the sensors convert sensor data to an electrical signal; and wherein the sensors comprise at least one of: electromagnetic; electrochemical; electric current; electric potential; magnetic; radio; air flow; accelerometers; pressure; electro-acoustic; electro-optical; photoelectric; electrostatic; thermoelectric; radio-acoustic; environmental; moisture; humidity; fluid velocity; position; angle; displacement; or combinations thereof.

13. The system of claim 6, wherein the system is adapted to communicate with a cloud-based network;
wherein factory settings, user settings and sensor data are stored in the cloud-based network;
wherein the cloud-based network comprises a processor configured to:
determine ratings for a specific towing set-up of tow vehicle, trailer and all associated tow equipment to confirm tow equipment compatibility; and
transmit the tow equipment compatibility to the system based on a user command, the sensor data, the factory settings, and the user settings.

14. The system of claim 1, wherein the data input device comprises a cell phone, satellite phone, smartphone, personal digital assistant, tablet computer, laptop computer, remote control device, mobile transmitter, a mobile internet device or a combination of one or more of the same.

15. The system of claim 1, wherein the tow equipment is selected from a group consisting of a tow vehicle, trailer, hitch, ball, receiver, jack, lift, pin box, trailer, sensor, actuator, sway bar, stabilizer bar, weight distribution device, equipment connected to the trailer, equipment connected to the tow vehicle or combinations thereof.

16. The system of claim 1, wherein the system further comprises one or more energy storage devices.

17. The system of claim 1, wherein the system further comprises one or more energy harvesting devices.

18. The system of claim 1, wherein the system communicates the tow equipment compatibility data to the user via audible alerts.

19. The system of claim 1, wherein the system communicates tow equipment compatibility data to the user via visual alerts.

20. The system of claim 1, wherein the system further comprises a network hub device for connection of the system to a network.

* * * * *